United States Patent [19]

Parkes et al.

[11] Patent Number: 4,582,551

[45] Date of Patent: Apr. 15, 1986

[54] SEALING JOINTS AND LEAKS WITH AN ANAEROBIC LIQUID

[75] Inventors: Adrian S. Parkes, Burgess Hill; Gordon J. Corbett, Croydon; Peter S. Clough, Stretford; Colin N. H. Barker, Offerton, all of England

[73] Assignee: British Gas Corporation, London, England

[21] Appl. No.: 612,841

[22] Filed: May 22, 1984

[30] Foreign Application Priority Data

May 23, 1983 [GB] United Kingdom ............... 8314209

[51] Int. Cl.[4] ............................................. B32B 35/00
[52] U.S. Cl. ................................. 156/94; 29/402.18; 138/97; 264/36; 285/15; 427/140
[58] Field of Search ............... 29/402.02, 402.18; 138/97, 98; 156/94, 332; 264/36; 285/15; 427/140, 142

[56] References Cited

U.S. PATENT DOCUMENTS

| 4,304,805 | 12/1981 | Packo et al. ............... 156/94 X |
| 4,331,580 | 5/1982 | Bunyan ..................... 156/294 X |
| 4,419,163 | 12/1983 | Yamamoto et al. ......... 156/94 |
| 4,528,150 | 7/1985 | Charlebois et al. ......... 264/36 |
| 4,529,008 | 7/1985 | Appleton ................... 138/97 |

Primary Examiner—Robert A. Dawson
Attorney, Agent, or Firm—Larson and Taylor

[57] ABSTRACT

Joints and leaks in pipelines or mains are sealed by injecting into the joint or leak a sealant by means of an expandible tubular pig which is moved endwise through the pipeline or main. The sealant is in the form of an anaerobically curable monomer which cures in the relatively air free conditions in the joint or leak. The pig forms within the pipeline or main an air-free space which communicates with the joint or leak and which is isolated from the fluid in the main. Nevertheless the pig is hollow to permit the flow of fluid therethrough while the joint or leak is sealed. The sealant is injected into the joint or leak by way of the space so that the sealant cures in situ in the joint or leak.

9 Claims, 19 Drawing Figures

SEALING JOINTS AND LEAKS WITH AN ANAEROBIC LIQUID

This invention relates to the sealing of joints and/or leaks in pipelines or mains particularly those which are "live", that is, are carrying fluids such as gas, water or sewage although the invention is particularly concerned with the sealing of joints or leaks in gas pipelines or mains.

A substantial problem has arisen in the gas and gas transportation industry consequent upon the replacement of coal gas as a source of domestic and industrial fuel, by natural gas. Traditionally and for many generations coal gas has been fed to customers by underground gas pipes and mains, usually of cast iron, many of which have been in service for decades. In most cases such pipes were laid underground and joined together by lap joints packed with hemp and sealed with a lead seal. Although the lead was intended as the primary seal between the lapped pipe ends and the hemp merely a packing to prevent molten lead flowing into the interior of the pipe during the jointing process, in a large proportion of cases the lead seal was incomplete, due, for example, to contraction of the lead, or subsequent pipe movement which broke the seal. In practice it has been the hemp which provided the seal, and a contributing factor to the effectiveness of the hemp packing as the seal has been the relatively high moisture content of the previously used coal or town gas. The hemp packing absorbs this moisture and swells to provide a gas-tight seal between the lapped pipe ends. Also over a period of time tarry deposits build up in and around the joint, further contributing to the effectiveness of the seal. With the advent of the much drier natural gas, however, the hemp packing in the old gas mains has dried out, and contracted so that the seal has broken down and major leaks have developed. Inasmuch that many of the joints in existing pipelines are now virtually inaccessible e.g. buried under roads, buildings etc. such leakages cause immense problems, and even where the pipelines are more readily accessible e.g. in open country or at the roadside, the repair of such leaks is costly due to the labour involved in digging down to the pipeline and exposing the offending joint.

Not only are leaking joints a problem, but so are pipe fractures caused in other ways, for example, by corrosion or land subsidence, or merely by overstressing of the pipe by heavy vehicles driving over the buried pipe, and these fractures can be equally difficult and costly to repair from the outside.

Techniques are available for sealing joints and leaks in underground pipelines and mains by the injection of a sealant composition into the joint or leak from the inside of the pipe or main, this being so called "internal sealing".

These techniques involve the use of a so-called pig or packer as the sealant injection device. Generally the pig is drawn or otherwise moved through the main or pipeline to the location of the joint or leak and a sealant composition is fed to the pig by appropriate feed line or feed-lines which trail behind the pig as it is drawn or moved through the main or pipeline and extend back to the point at which the pig is introduced into the main or pipeline. This can either be a permanent access point or a temporary access point exposed for the purpose, for example, by excavation at a more appropriate location than that at which the joint (leaking or otherwise) or the leak (caused by for example a fracture) is located. Once the pig is at the site of the fracture, the sealant can be injected into the joint or leak, as the case may be, to seal the joint or leak.

UK Patent Specification No. 965132 (Cement Linings Pty Ltd) discloses a technique for sealing in-situ cracks and breaks in a pipeline such as a sewer or water main. The technique involves the use of an elongated tubular pig having two separate expansible compartments at each end and a central section that is also expansible. In use the pig is moved along the main to the desired location and the central compartment is inflated against the joint or leak. Next the two end compartments are inflated and the central compartment is deflated or slightly deflated to form an annular channel into which sealant can be fed and applied as an annular bead against the wall of the main. If desired the central section can be reinflated to apply pressure to assist penetration of the sealant into the joint or fracture. After sealing, the pig can be deflated and moved to a new position in the main, or withdrawn, as the case may be.

UK Patent Specification No. 1328886 (British Gas Corporation) discloses a technique for sealing joints in pipelines, particularly gas mains. The technique involves the use of an elongated tubular pig having two inflatable end sections or seals which are spaced from each other by a central non-inflatable region. In use a ground region is excavated to expose part of the main. This is isolated from the adjoining portions of the main and a by-pass is connected at both ends of the isolated section. The pig is then advanced up one portion of the main until a first joint is detected by an electromagnetic sensor disposed at the front of the pig. The pig is then moved a further distance until the central non-inflatable region lies opposite the joint. The two seals are then inflated so that they form tight seals against the inner wall of the main, one on each side of the joint. Sealant is then injected under pressure by way of a trailing tube into the annular clearance formed between the seals, the central region of the pig and the wall of the main so that the sealant enters the joint to seal it. After sealing the seals are deflated and the pig is advanced to the next joint which is sealed and so on. After all the joints, or as many as necessary, have been sealed the pig can be withdrawn. The pig can be turned round and advanced up the other portion of the main to seal the joints in this portion in a similar manner.

In the prior techniques, the sealant usually takes the form of a two-component polymer system pumped either pre-mixed to the pig or the components are admixed just before they reach the joint or fracture, the components reacting to polymerise and form the seal at the joint or fracture.

One problem with such two-component systems is that it is quite difficult to control the relative quantities of each monomeric component of the mix for the formation of the polymer and the relative proportions must be accurately controlled to obtain good results.

According therefore to one aspect of the present invention, a method is provided for sealing a joint or leak in a pipeline or main, the method comprising forming within the pipeline or main a space which communicates with the joint of leak, injecting into the joint or leak by way of the space an anaerobically curable monomer and allowing or causing the monomer to polymerise in situ in the joint or leak as the case may be.

With the use of a monomer of the anaerobically curable kind, that is, one which will polymerise in the absence of air or oxygen, it is possible to avoid the mixing process which is necessary when the two-component monomer mixes are used as the sealant.

Furthermore it is possible to use the anaerobic sealant in the form of liquid which would clearly have a much lower viscosity than that of the conventional two-component system. This will enable the sealant to be pumped more quickly and easily to the site of the joint or leak than is possible with the more highly viscous two-component systems.

The rate of polymerisation of the monomer increases as the prevailing air or oxygen content in the environment decreases. In the relatively restricted confines of joint gaps and fissures, the air content will be relatively low and virtually non-existent if the mononer has fully penetrated the joint or leak. Polymerisation of the monomer will therefore tend to be rapid in these regions.

Preferably, to accelerate the rate of polymerisation still further, the space into which the mononer is injected initially is as air-free as possible and desirably the monomer is injected into the space immediately the space is formed to avoid the re-ingress of air thereinto. Furthermore, the monomer should be injected in such quantity that the space is completely occupied by the monomer. To enhance the penetration of the monomer into the joint or leak, pressure may be exerted on the monomer occupying the space to force further quantities of the monomer into the joint or leak.

It is preferred that the space into which the monomer is injected is not only as free of air as possible but in fact is as free as possible of any other contaminating fluid such as gas (in the case of gas pipelines and mains) and water. This will reduce the formation of pockets of fluid in the region of the joint or leak and thereby improve the bonding between the sealant and the wall of the pipeline or main.

The anaerobic monomer may be in the form of an acrylic monomer which inherently has, or which has been so treated that it, or compositions containing it have the property of undergoing spontaneous polymerisation in the absence of air or oxygen. Typical among such monomers are monoacrylates such as hydroxyethyl acrylate, glycidyl acrylate and methacrylate, cyclohexyl acrylate and tetrahydrofurfuryl methacrylate.

Alternatively liquid anaerobic sealant compositions comprising a polyfunctional acrylate as the anaerobically polymerisable monomer may be used.

Typical among such monomers are diethyleneglycol diacrylate and tri and tetra-ethyleneglycol dimethacylate. Also suitable are anaerobically curable compositions comprising urethane acrylate as the monomeric species.

Other polymerisable compositions may be used including other types of anaerobics based on monomers other than acrylates.

Additionally such sealant compositions may also contain a toughening agent e.g. a low molecular weight elastomer such as the chlorosulphonated polyethylenes and carboxy and vinyl terminated butadiene polymers and co-polymers.

The pipeline or main in which the joint or leak is located may be "live" as hereindefined in which case the fluid carried by the pipeline or main preferably is allowed to continue to flow inside the pipeline or main past the joint or leak.

The monomer may be continuously pumped from a reservoir to the site of the joint or leak during sealing, excess monomer at the site being returned to the reservoir for further use. This prevents the monomer curing in the feed lines.

Embodiments of the invention will now be particularly described with reference to the accompanying drawings in which.

Figure 1:
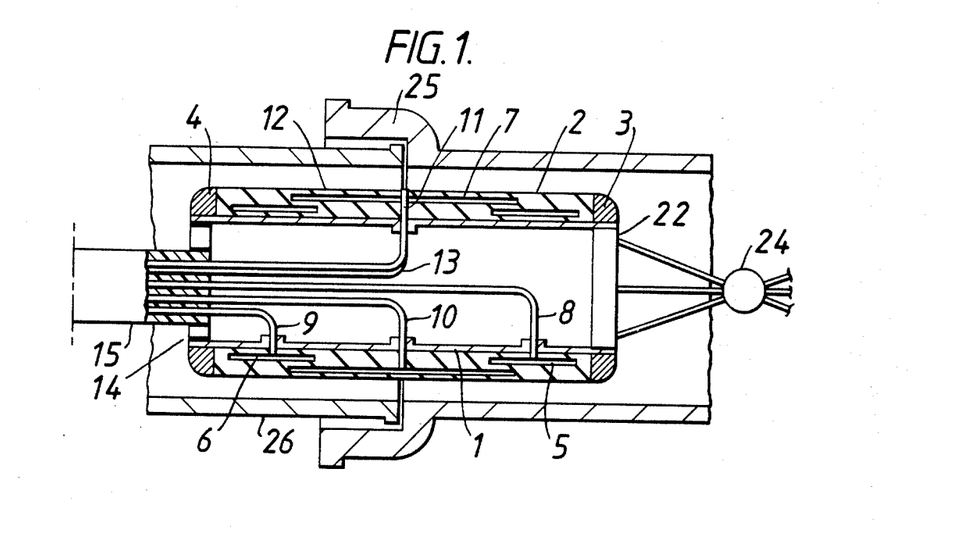
FIG. 1 shows a sectioned side view of an expandible tubular pig in situ in a gas main in the unexpanded condition.
Figure 2:
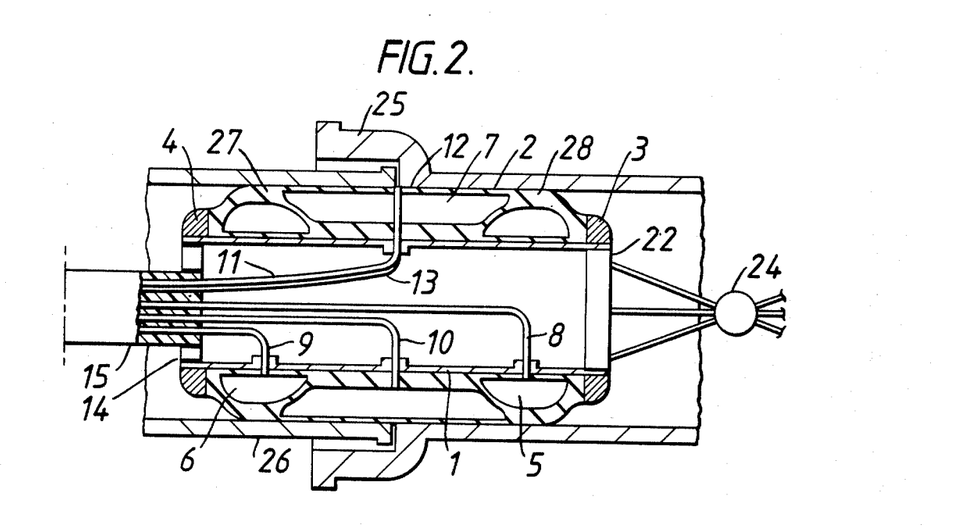
FIG. 2 is a view similar to FIG. 1 showing the pig in the fully expanded condition.
Figure 3:
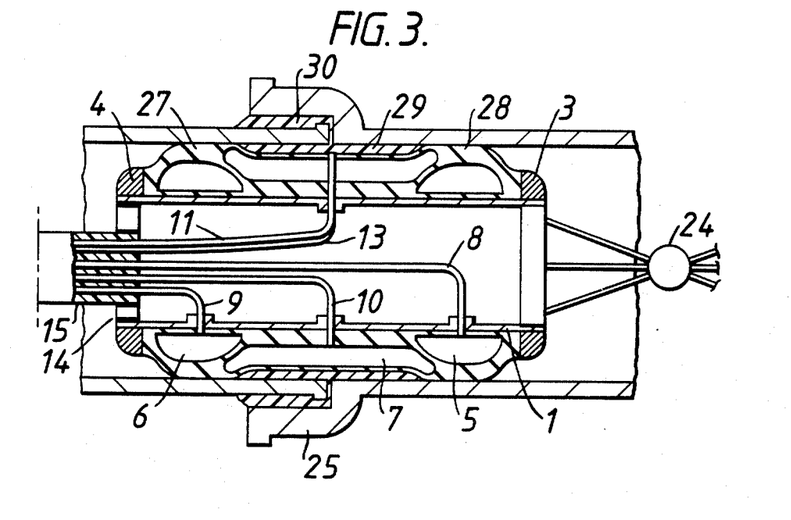
FIG. 3 is a view similar to FIG. 2 showing the central compartment of the pig slightly deflated.

Referring to FIGS. 1 to 3, the pig comprises a hollow steel central tube 1 circumventing which is an expandable sleeve 2 of rubber, elastomer or other suitable flexible material.

The sleeve 2 is secured at each end to a pair of steel clamping rings 3, 4 which are welded or otherwise secured to the periphery of the tube 1.

The sleeve 2 is provided with three annular adjoining compartments 5, 6, 7, there being two identical end compartments 5 and 6 and a central compartment 7 which is radially more distant from the tube 1 than the other compartments 5 and 6, the central compartment 7 slightly overlapping the other compartments 5 and 6.

Nitrogen gas feed lines 8, 9, and 10 extend through the tube 1 and terminate in outlets in each of the compartments 5, 6, and 7, said feed lines supplying nitrogen from a suitable source, e.g. a cylinder to inflate the compartments as required.

A sealant supply line 11 extends through the tube 1 and terminates in the outer skin 12 of the central compartment 7 to supply sealant to the site of the joint (or leak).

A sealant return line 13 also extends through the tube 1 and into the outer skin 12 of the central compartment 7 to provide a return for excess sealant not used in the sealing process.

Each of the lines 8, 9, 10, 11 and 13 extend rearwardly through the rear end 14 of the pig and are encased in a flexible tube of mastic 15. While not shown the pressure in the feed lines 8 to 10 is controlled by a valve, suitable pressure gauges being provided.

Figure 4:
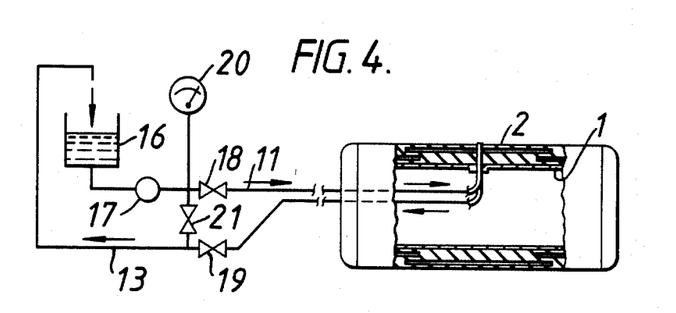
FIG. 4 shows in schematic form the reservoir and pumping system for supplying sealant to, and returning excess sealant from the pig.
Figure 5:
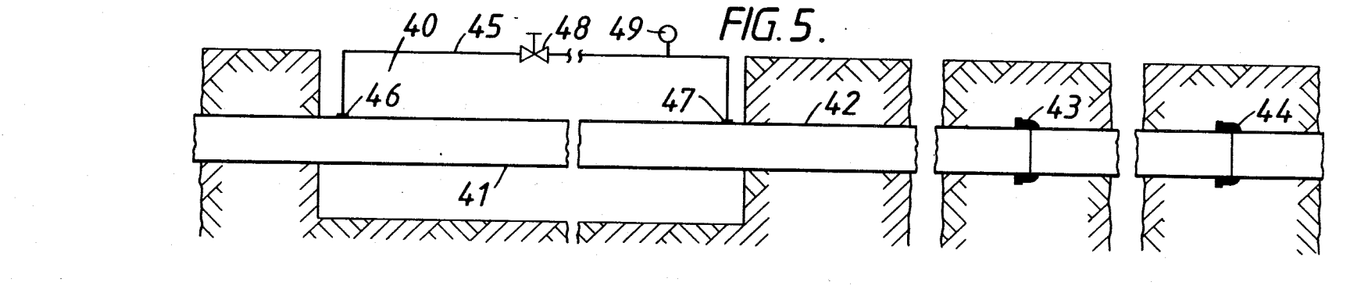
FIGS. 5 to 13 illustrate schematically the steps involved in sealing one or more joints in a gas main using one type of technique.

Referring to FIG. 4, sealant is supplied to the sealant supply line 11 from a reservoir 16 containing the sealant, there being a pump 17 in the line 11 to pump the sealant to the pig. The supply line 11 also contains a valve 18 for controlling the supply pressure. Excess sealant is returned to the reservoir 16 as previously described by way of the return line 13, this also containing a valve 19 for controlling the return pressure. A pressure gauge 20 connected by way of a valve 21 to the return line 13 enables the pressure in the system to be measured for control purposes.

The system shown in FIG. 4 is necessary when the sealant is of the anaerobic type i.e. one which polymerises spontaneously in the absence of air oxygen. This type of sealant must be continously circulated to and from the site of the joint or leak to avoid its curing in the feed and return lines where, since there is little or no air or oxygen, spontaneous polymerisation would occur if the sealant were to remain stagnant for a period of time. The reservoir 16 is aerated to prevent spontaneous polymerisation of the monomer held in the reservoir 16.

A device 23 (shown in FIG. 8 and others) for locating joints and fractures is attached to the front end 22 of the pig by a suitable flexible cable-hitch arrangement 24 as shown in FIGS. 1 to 3. The device 23 may be a closed circuit television camera or an electromagnetic sensor. Cabling (not shown) may extend rearwardly through the centre of the pig to a suitable display unit e.g. a television in the case of a TV unit or a voltmeter or the like in the case of an electromagnetic sensor.

In use of the pig shown in FIGS. 1 to 4, the sensor and the pig are advanced up the main until the relevant joint or fracture is identified by sensor. The pig is then moved the appropriate predetermined further distance until its sealant supply line 11 is located opposite to the joint or fracture to be sealed. In FIGS. 1 to 3 the pig is being used to seal a joint 25 in a gas main 26 through which gas is flowing.

When the pig is opposite the joint the central compartment 7 is inflated with nitrogen so that its outer skin 12 engages with the internal wall of the gas main to expel any gas in the vicinity of the joint laterally along the wall of the main 26 and possibly also through the joint 25 itself and so that the skin 12 forms a seal with the internal wall of the main 26. Next the two end compartments 5 and 6 are inflated with nitrogen until their outer skins 27 and 28 engage and form a seal with the internal wall of the main 26. This is the situation shown in FIG. 2.

In the next step, the central compartment 7 is either partially or fully deflated by partially or fully releasing the gas pressure. The outer skin 12 then becomes detached from the wall of the main 26 and there is formed between the skin 12, the internal wall of the main 26 and the outer still-inflated compartments 5 and 6, an annular substantially air and gas-free space 29 circumventing the joint 26 as shown in FIG. 3.

Sealant is then pumped along the sealant supply line to the space 29 so that it enters and fills the space 29 as soon as it is formed or as soon as possible thereafter. Some of the sealant 30 also penetrates the joint gap 25 as shown in FIG. 3. In the relatively air-free conditions now prevailing in the space 29 and joint gap 25 the sealant, if of the anaerobic type, will polmerise relatively quickly and form an air and gas tight seal in the joint gap 25. In addition, the gas and air-free conditions will enhance bonding between the sealant and the adjacent surfaces of the main since there will be little if any gas or air to form pockets to be trapped in the sealant.

Excess sealant returns by way of the return line 13 to the resevoir 16 for further use. To ensure adequate sealing, the sealant should be pumped for several minuutes.

To assist in the penetration of the joint by the sealant, the central compartment 7 can be reinflated to exert a pressure on the sealant in the space 29 to force it into the joint 25. Conditions for rapid polymerisation of the sealant, if of the anaerobic type, will be enhanced if the sealant has fully penetrated the joint gap since there will then be relatively little, if any, air in the gap.

After the joint has been sealed, the compartments 5, 6, and 7 are deflated and the pig is either withdrawn or moved to a further joint to be sealed.

Referring to FIGS. 5 to 13, the technique to be described is suitable for sealing joints in relatively short lengths of underground gas main.

In the first sept of the process, (FIG. 5) an excavation 40 is dug to expose a section 41 at the end of a length of the main 42 containing the joints 43 and 44 to be sealed. Next a temporary by-pass 45 is connected between two spaced drilled apertures 46 and 47 in the exposed section 41 of the main 42. The by-pass 45 is provided with the usual manually operable shut-off valve 48 and pressure gauge 49.

Figure 6:
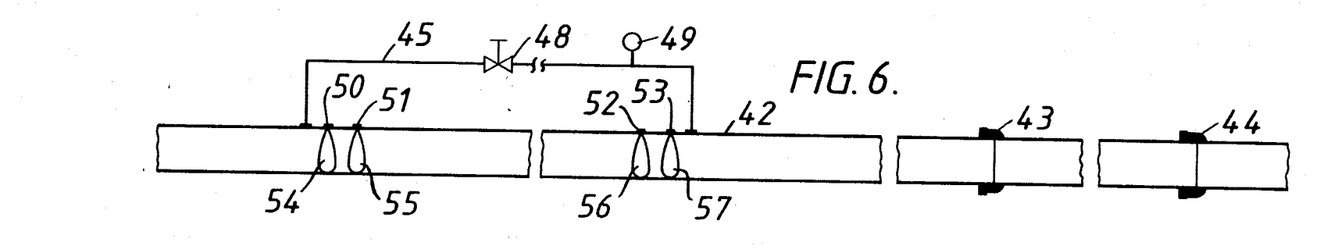
Figure 7:
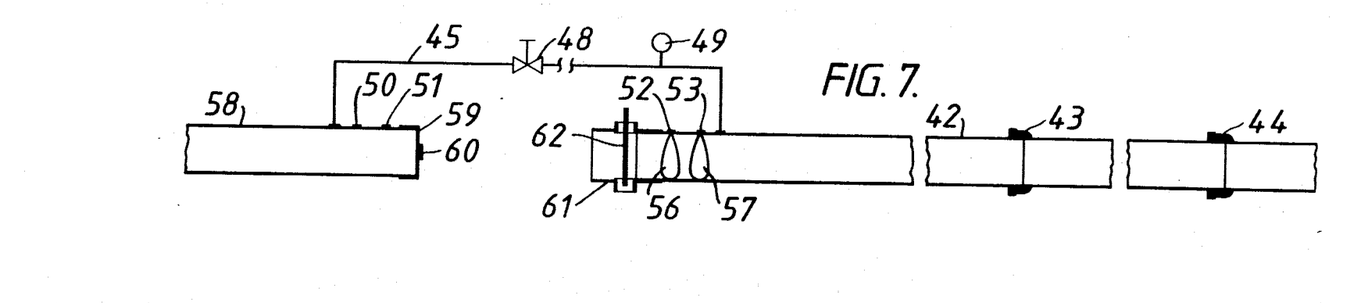

Referring to FIG. 6, four further apertures 50, 51 and 52, 53 are drilled in the main 42, between the ends of the by-pass 45, the apertures being tapped and plugged, sufficient space being left between the adjacent apertures 51 and 52 to enable part of the section 41 to be removed. The plugs are removed from the apertures 50 to 53, and inflatable sealing bags 54 and 55 are inserted through the apertures 50 and 51 and a similar pair of inflatable sealing bags 56 and 57 are inserted through the apertures 52 and 53.

These bags are then inflated to obstruct the flow of gas through the section 41 and divert it through the by-pass 45, the remainder of the main 42 being otherwise isolated. With the bags 54 to 57 still in place, a portion of the section 41 lying between bags 55 and 56 is removed by cutting with a main cutter to leave the main 42 permanently isolated from the end 58 now formed (see FIG. 7). The end 58 of the main is capped off with a cap 59 and screw in plug 60 and the bags 54 and 55 are deflated and removed, the apertures 50 and 51 being plugged. To the now exposed end of the main 42 there is fitted an insertion duct 61 which forms a temporary seal at the end of the main 42. The insertion duct 61 is of a conventional type such as that described in our published UK Patent Application No. 2103753A, the duct 61 in this case incorporating merely a known-type gate valve 62. After the duct 61 has been attached to the main 42 by the known-type of Viking Johnson joint, the bags 56 and 57 are deflated and removed, the apertures 52 and 53 being plugged.

Figures 8, 9, 10:
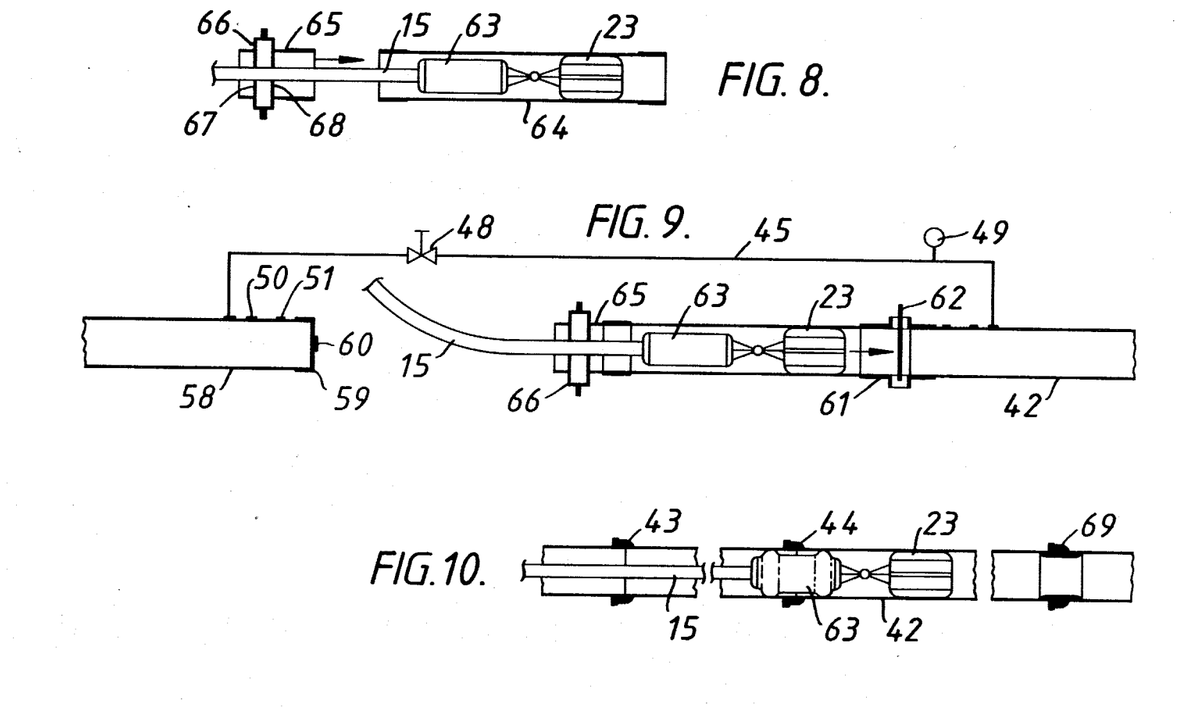

Referring to FIG. 8, the pig 63 and its joint locator 23 are first of all located in a pig trap comprising a short length of pipe. The tube incorporating the feed lines is passed through a further insertion duct 65 also similar to that described in our published UK Patent Application No. 2103753A, this duct merely incorporating a known-type gland 66 comprising two spaced annular rubber seals 67 and 68 through the centre of which passes the tube 15. The outer wall of the tube 15 and TV cabling (temporarily secured to the tube surface) are engaged by the radially inward surfaces of the seals 67 and 68 for sealing purposes. The gland 66 may be of the type including a lubricating nipple to permit lubricant to be introduced into the space between the seals 67 and 68 to lubricate the outer surface of the tube 15 for easier passage through the gland 66. Obviously to enable the tube 15 to be inserted into the gland 66, the feed lines must initially be uncoupled from the gas supply cylinder, pumps, pressure gauges and reservoir as the case may be.

Referring to FIG. 9 after the tube 15 and TV cabling or the like has been passed through the gland 66, the feed lines may be coupled to the gas cylinder etc. Once the tube 15 has been passed through the gland 66, the insertion duct 65 is connected to the pig trap 65 by conventional means e.g. a Viking Johnson joint. Similarly the pig trap 64 itself is then connected to the insertion duct 61 by any suitable means e.g. a Viking Johnson joint.

The tube 15 is relatively stiff and the pig 63 and locator 23 may be advanced up the main 42 simply by pushing the tube 15 along the main 42. The gate valve 62 must be lifted to permit the locator 23 and pig 63 to enter the main 42. Referring to FIG. 10, in practice, the locator 23 and pig 63 are first of all pushed along to that joint 69 which is most distant from the pig-trap end of the main 42. After identification, the joint is then sealed by the procedure which has already been described in the discussion of FIGS. 1 to 4. The pig is deflated and the tube 15 is then pulled back until the locator 23 identifies the next joint to be sealed (joint 44 in FIG. 10).

The pig 63 is then advanced until the sealant feed line is opposite to the joint and it is also sealed. The pig 63 is then pulled back and the next joint (43 in FIG. 10) is sealed. This procedure is repeated until all the joints have been sealed.

Figure 11:
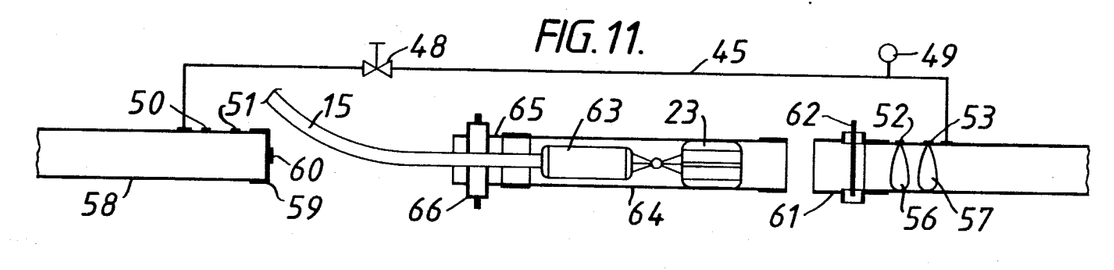

Referring to FIG. 11, the pig 63 and locator 23 are withdrawn by the tube 15 into the pig trap 64 after the last joint has been sealed. The gate valve 62 is then closed and the bags 56 and 57 are reintroduced into the main 42, the plugs having first been removed from the apertures 52 and 53. The bags 56 and 57 are then inflated to seal off the end of the main 42. The pig trap 64 is then removed from the end of the main 42 by uncoupling the Viking Johnson joint.

Figure 12:
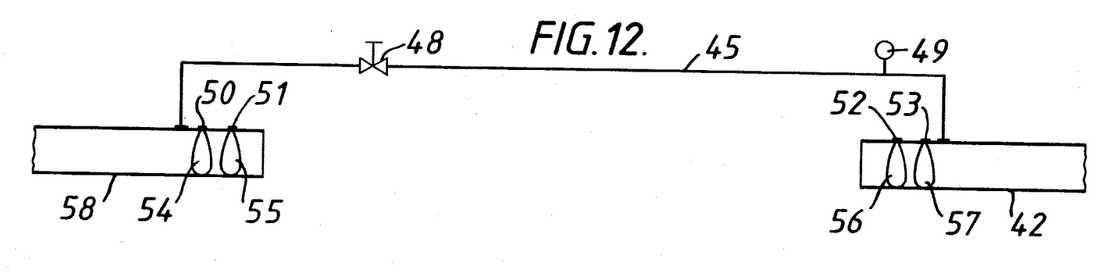

In the next step of the procedure, the gate valve 62 is removed by uncoupling its Viking Johnson joint. Once the pig trap 64 and gate valve 61 have been removed it is necessary permanently to connect the main 58 to the main 42 so that the temporary by-pass 45 may be removed. In this case the bags 54 and 55 and reintroduced into the main 58 through the apertures 50 and 51 after the plugs have been removed. The end cap 59 is then removed from the main 58 as shown in FIG. 12.

Figure 13:
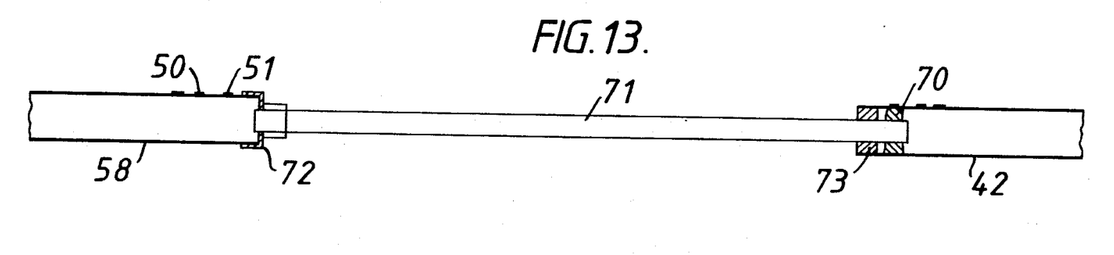

One end of a length of plastics replacement main is then inserted into the end of the main 42, an aperture is drilled in the main 42 between the bag 56 and 57 and the end of the main 42 and an expandable synthetic resin, for example, polyurethane foam is injected through the aperture and into the main 42. The foam is allowed to expand and set. The foam forms an annular seal 70 between the internal wall of the main 42 and the external wall of the replacement main 71 as shown in FIG. 13.

The free end of the replacement main 71 is connected to a closed purge valve (not shown) and the bags 56 and 57 are removed and the apertures 52 and 53 are plugged. The purge valve is opened so that gas from the main 42 can enter the replacement main 71 and purge it of any air. Next the main 71 is squeezed flat by a clamp (not shown) at a point near the purge valve end so as to stop the flow of gas to the purge valve. The valve is removed and the free end of the replacement main 71 is connected to the main 58 by means of a known-type of coupling cap 72.

Finally the clamp is removed and the bags 54 and 55 are withdrawn and the apertures 50 and 51 replugged so that gas can flow between the mains 42 and 58 by way of the replacement main 71. Further details of this procedure are contained in our published UK Patent Application No. 2103753A. Before the end of the main 71 is inserted into the main 42 an annular rubber seal may be pushed over it so as to form a further permanent annular seal 73 at the end of the main 71 between it and the inner wall of the main 42 when the seal 73 is pushed into the main 42. A typical seal is the Raychem plug seal.

Referring to FIGS. 14 to 19, the technique described is suitable for sealing joints in relatively long length underground mains. Parts identical to those described in FIGS. 5 to 13 bear the same reference numerals.

Figure 14:
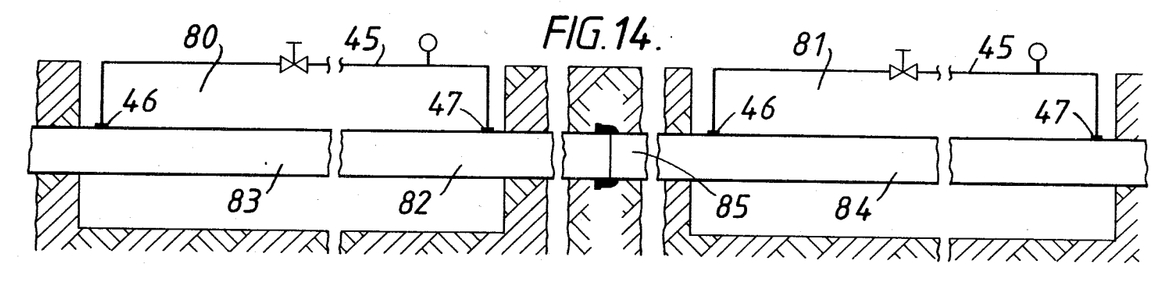
FIGS. 14 to 19 illustrate schematically the steps involved in sealing several joints in a gas main using another type of technique.

In this procedure two excavations 80 and 81 are dug at each end of the main 82 containing the joints to be sealed as shown in FIG. 14 to expose two sections 83 and 84 of the main 82. Each section is fitted with a temporary by-pass 45 identical to that previously described, apertures 46 and 47 being drilled for the purpose.

Figure 15:
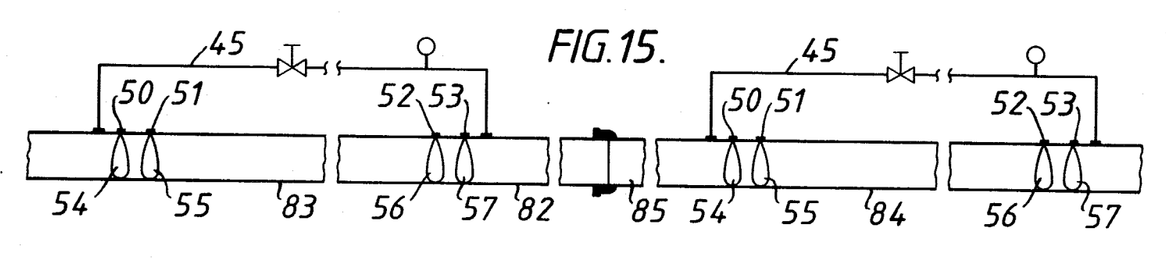

Next four further apertures 50,51 and 52,53 are drilled in each exposed section 83,84 of the main 83 between the ends of the by-passes 45 as shown in FIG. 15. The apertures are tapped and plugged, there being sufficient space left between adjacent apertures 51 and 52 to enable part of each section 82,83 to be removed. The plugs are removed from the apertures 50 to 53 and inflatable sealing bags 54 and 55 are inserted through apertures 50 and 51 and a similar pair of inflatable sealing bags 56 and 57 are inserted through the apertures 52 and 53. The bags are then inflated to obstruct gas flow through the sections 83 and 84 and divert it through the by-passes 45.

With the bags still in place, part of each of the sections 83 and 84 is removed by cutting with a main cutter to leave a central part 85 of the main 82 isolated from the two newly-formed outer ends 86,87 of the main 82.

Figure 16:
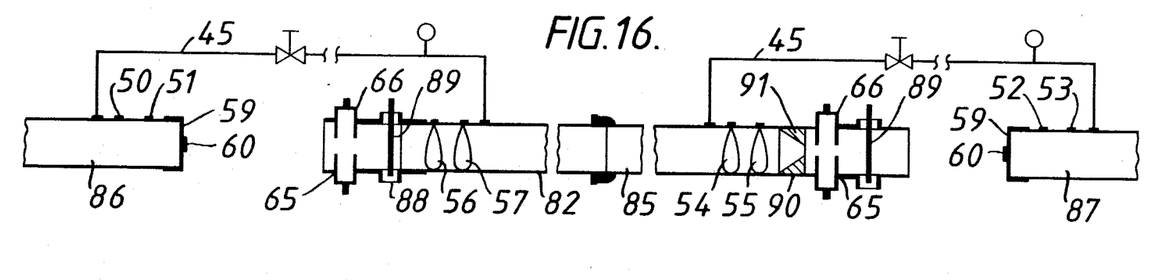

As shown in FIG. 16, the ends 86 and 87 of the main 82 are capped off with a cap 59 and screw in plug 60 and the bags 54,55 in the end 86 are removed and bags 56,57 in the end 87 are removed, the apertures 50,51 in the end 86 and 52,53 in the end 87 being plugged.

To the left hand end of the central portion 85 of the main 82 is first of all connected an insertion duct 88 similar to that previously described. This is connected to the main 82 by means of a Viking Johnson joint. However, the insertion duct 88 incorporates a so-called diamond gate-valve 89 rather than a lift-type gate valve as previously described. This known-type diamond valve 89 is operable to provide an opening of variable dimension, such opening being in the form of a diamond or rectangle with rubber seals forming the periphery of the opening. The valve 89 can of course be completely closed as and when required. A further insertion duct 65 similar to that previously described and including a lubricated gland 66 is then secured by a Viking Johnson joint to the duct 88.

To the right hand end of the central portion 85 of the main 82 is first of all fitted an insertion duct 90 by means of a Viking Johnson joint. The duct 90 has a tapering trumpet 91 for a purpose to be described and a gland 66 similar to that previously described.

Next a further insertion duct 88 similar to that described and incorporating diamond type gate valve 89 is connected to the duct 90 also by means of a Viking Johnson joint.

Figure 17:
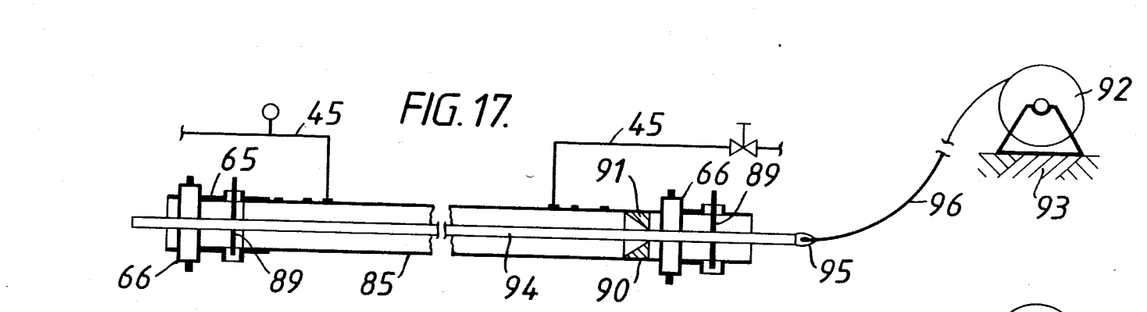

Referring to FIG. 17, a winch 92 is disposed above ground 93 adjacent to the end 87 of the main 82. A stiff rod 94 is inserted through the left hand end of the main 82 through the gland 65 which forms a gas tight seal with the rod 94. The diamond valve 89 which was closed is now opened sufficiently to permit entry of the rod 94 to the main 85. The valve 89 is then closed so that its sealing surfaces engage the rod surface to form a further seal with the rod 94.

The rod 94 is then pushed through the main 85 and enters the wider end of the trumpet 91 which serves as a guide to guide the rod towards the gland 66 and the diamond valve 89. It will be appreciated of course that the valve 89 in the duct 90 is closed until the rod 94 engages it. The gland 66 forms a gas tight seal with the rod 94 and then the valve 89 is opened and the rod 94 is pushed through it following which the valve 89 is closed down on the rod 94 to form a further seal with the rod 94.

The rod 94 is finally pushed out of the main 85. As shown in FIG. 17, the rod 94 has at its leading end an eye 95 to which the cable 96 of the winch 92 is attached.

After the cable 96 has been attached to the rod 94, the rod 94 is pulled back through the main 94, to pull with it the winch cable 96. As the cable 96 enters each of the diamond valves 89, these are closed down on it so as to make a seal with the cable 96 and prevent gas escaping from the main 85.

Figure 18:
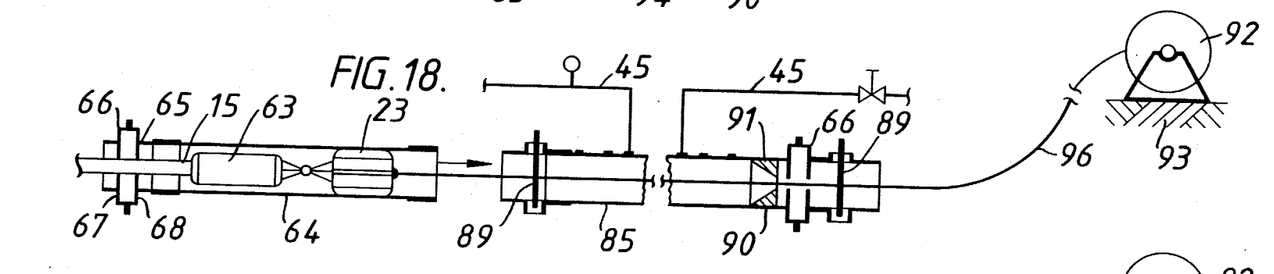

Referring to FIG. 18, when the cable 96 has been withdrawn through the left hand end of the main 85, it is disconnected from the rod 94 and the duct 65 is removed from the left hand end of the main 85 over the cable 96. The cable 96 is then connected to the front end of the joint locator 23 which is disposed with the pig 63 within the pig trap 64.

An insertion duct 65 is attached to the rear end of the pig trap 64 and the pig trap 64 is secured by means of a Viking Johnson joint to the left hand end of the main 85. As described with reference to FIGS. 8 and 9 the pig tube 15 housing the feed lines extends sealingly back through the gland 66 in the duct 65.

The joint locator 23 and pig 63 are then towed by the cable 96 from the left hand end of the main 85 to that joint nearest to the right hand end of the main 82. It will be necessary to fully open the diamond valve 89 at the left hand end of the main 85 to permit the passage of the locator 23 and pig 63 therethrough. This valve can be closed down on the tube 15 when the locator 23 and pig 63 have passed through.

The joints are then sequentially sealed in turn as previously described. The locator 23 and pig 63 are pulled back to the left hand end of the main 85 by tugging on the tube 15. After each joint has been located, the pig is winched forward to the joint to be sealed. This procedure is followed until the last joint has been sealed. This joint will be nearest to the left hand end of the main 85.

Figure 19:
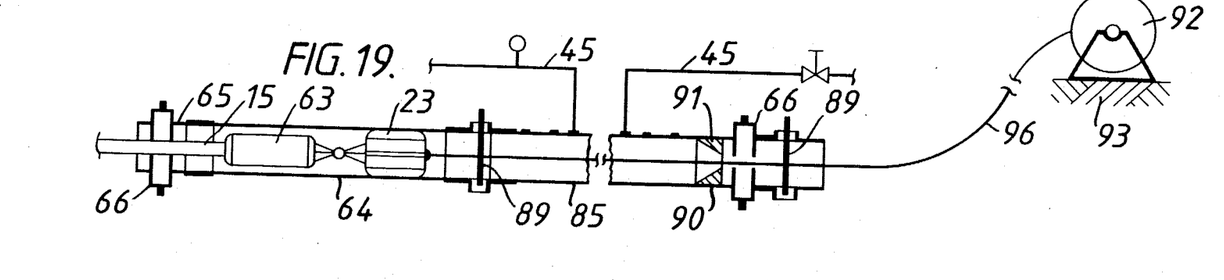

Referring to FIG. 19, when the pig and locator reach the diamond valve 89 at the left hand end of the main 85, the valve 89 is fully open to permit withdrawal of the pig and locator. Immediately the pig and locator have passed through the valve 89, it is closed down to form a seal with the cable 96.

The pig trap 64, into which the locator and pig are eventually pulled, is then removed from the left hand end of the main 85 and the cable 96 is detached from the locator 23.

Next, the cable 96 is winched back through and out of the main 85, the diamond valves 89 being closed immediately the cable 90 has passed through them.

In the next stage the main 85 is once again bagged off at both its ends and the ducts are all removed. Then two lengths of replacement main (not shown) are connected between the main 86 and the main 85 and the main 87 and the main 85 using the technique already described with reference to FIGS. 12 and 13. The excavations may then be back-filled as usual.

The joint locator 23 is designed to slide on skids or the like, there being gaps between the central body of the locator 23 and the skids to let gas pass through. Gas can also pass through the hollow centre of the pig 63. Therefore the sealing of joints can take place in "live" conditions i.e. with gas flowing along the main at all times.

The term "joint" used in this specification includes not only those joints which are actually leaking but in fact any joint whether or not it is leaking. Sealing non-leaking joints will serve as a preventative measure.

The term "leak" includes all types of leak caused by fractures and fissures in the wall of the pipeline or main.

We claim:

1. A method for sealing a joint or leak in a pipeline or main, the method comprising forming within the pipeline or main a space which is as free as possible of any fluid and which communicates with the joint or leak, injecting into the joint or leak by way of the space an anaerobically curable liquid monomer and allowing or causing the liquid monomer to polymerise in situ in the joint or leak as the case may be.

2. A method as claimed in claim 1 in which the monomer is injected into the space immediately after the space is formed.

3. A method as claimed in claim 2 in which the monomer is injected in such quantity that the space is completely occupied by the monomer.

4. A method as claimed in claim 3 in which the pressure is exerted on the monomer occupying the space to force further quanties of the monomer into the joint or leak.

5. A method as claimed in claim 1 in which the monomer is in the form of an acrylic monomer.

6. A method as claimed in claim 5 in which the monomer is a monoacrylate.

7. A method as claimed in claim 5 in which the monomer is a polyfunctional acrylate.

8. A method as claimed in claim 1 or claim 2 in which the monomer is in the form of a composition containing a toughening agent.

9. A method as claimed in claim 1 in which the sealant is held in a reservoir and is continously circulated between the joint or leak and the reservoir.

* * * * *